United States Patent
Purdy et al.

(10) Patent No.: US 10,035,944 B2
(45) Date of Patent: *Jul. 31, 2018

(54) USING SYNTHETIC ACID COMPOSITIONS AS ALTERNATIVES TO CONVENTIONAL ACIDS IN THE OIL AND GAS INDUSTRY

(71) Applicant: FLUID ENERGY GROUP LTD, Calgary (CA)

(72) Inventors: Clay Purdy, Medicine Hat (CA); Darren Thatcher, High River (CA); Jon Garner, Stony Plain (CA); Bruce Ulmer, Stony Plain (CA)

(73) Assignee: FLUID ENERGY GROUP LTD, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/314,284

(22) PCT Filed: May 28, 2015

(86) PCT No.: PCT/CA2015/000346
§ 371 (c)(1),
(2) Date: Nov. 28, 2016

(87) PCT Pub. No.: WO2015/179954
PCT Pub. Date: Dec. 3, 2015

(65) Prior Publication Data
US 2017/0096596 A1    Apr. 6, 2017

(30) Foreign Application Priority Data

May 30, 2014 (CA) ...................................... 2852705
Oct. 2, 2014 (CA) ...................................... 2866688

(51) Int. Cl.
*C09K 8/528* (2006.01)
*C09K 8/54* (2006.01)
*C09K 8/72* (2006.01)
*E21B 43/22* (2006.01)
*E21B 43/25* (2006.01)
*C09K 8/86* (2006.01)
*C09K 8/52* (2006.01)
*E21B 31/00* (2006.01)
*E21B 37/00* (2006.01)
*E21B 37/06* (2006.01)
*E21B 43/16* (2006.01)
*E21B 43/26* (2006.01)

(52) U.S. Cl.
CPC ................ *C09K 8/528* (2013.01); *C09K 8/52* (2013.01); *C09K 8/54* (2013.01); *C09K 8/72* (2013.01); *C09K 8/86* (2013.01); *E21B 31/00* (2013.01); *C09K 2208/02* (2013.01); *C09K 2208/32* (2013.01); *E21B 37/00* (2013.01); *E21B 37/06* (2013.01); *E21B 43/16* (2013.01); *E21B 43/26* (2013.01)

(58) Field of Classification Search
CPC . C09K 8/528; C09K 8/54; C09K 8/74; C09K 2208/32; C09K 8/86; C09K 8/68; C09K 8/52; E21B 37/00; E21B 37/06; E21B 43/26; E21B 43/16; E21B 43/25
See application file for complete search history.

(56) References Cited

U.S. PATENT DOCUMENTS 8,430,971 B1    4/2013    MacDonald

OTHER PUBLICATIONS

International Search Report and Written Opinion prepared by the Canadian Intellectual Property Office dated Jul. 22, 2015 for International Application No. PCT/CA2015/000346.

*Primary Examiner* — Zakiya W Bates
(74) *Attorney, Agent, or Firm* — Berg Hill Greenleaf & Ruscitti LLP

(57) ABSTRACT

A synthetic acid composition for use in oil industry activities is disclosed. The composition comprises urea and hydrogen chloride in a molar ratio of not less than 0.1:1; a metal iodide or iodate; an alcohol or derivative thereof. Optionally, the composition may include formic acid or a derivative thereof propylene glycol or a derivative thereof, ethylene glycol glycerol or a mixture thereof; cinnamaldehyde or a derivative thereof; and a phosphonic acid derivative.

35 Claims, No Drawings

USING SYNTHETIC ACID COMPOSITIONS AS ALTERNATIVES TO CONVENTIONAL ACIDS IN THE OIL AND GAS INDUSTRY

CROSS REFERENCE TO RELATED APPLICATIONS

This application is a national stage application under 35 U.S.C. 371 and claims the benefit of PCT Application No. PCT/CA2015/000346 having an international filing date of 28 May 2015, which designated the United States, which PCT application claimed the benefit of Canadian Patent Application No. 2,852,705 filed 30 May 2014, and Canadian Patent Application No. 2,866,688 filed 2 Oct. 2014, the disclosure of each of which are incorporated herein by reference.

FIELD OF THE INVENTION

This invention relates to compositions for use in performing various applications in the oil & gas industry, more specifically to synthetic acid compositions as alternatives to conventional acids.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation is used to further encourage permeability and flow from an already existing well that has become under-productive.

Acidizing is a type of stimulation treatment which can be performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks.

There are three major types of acid applications; matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow, in addition to forming a series of wormholes.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces Hydrogen chloride gas which is toxic (potentially fatal) and corrosive to skin, eyes and metals. At levels above 50 ppm (parts per million) it can be immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically if near the public, large areas need to be evacuated post event. Because of its acidic nature, hydrogen chloride gas is also corrosive, particularly in the presence of moisture.

The inability for acids and blends of such to biodegrade naturally results in expensive cleanup-reclamation costs for the operator should an unintended release occur. Moreover, the toxic fumes or vapours produced by mineral & organic acids are harmful to humans/animals and are highly corrosive and/or potentially explosive. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation.

Another concern is the potential for exposure incidents on locations due to high corrosion levels of acids causing storage container failures and/or deployment equipment failures i.e. coiled tubing or treatment iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located far from oil & gas applications, up to 10 additives can be required to control various aspects of the acids properties adding to complications in the handling and shipping logistics. Having an alternative that requires minimal additives is very advantageous.

Extremely high corrosion and reaction rates with temperature increases can cause conventional acids to "spend/react or become neutral" prior to achieving its desired effect such as penetrating an oil or gas formation to increase the wormhole "pathway" effectively to allow the petroleum product to flow freely to the surface. As an example, hydrochloric acid or a "mud acid" can be utilized in an attempt to free stuck drill pipe in some situations. Prior to getting to the required depth to dissolve the formation that has caused the pipe/tubing to become stuck, many acids spend or neutralize due to increased bottom hole temperatures and increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids, acids will create a high amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict, regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars. Conventional acids are also very destructive to most elastomers found in the oil & gas industry such as those found in blow out preventers (BOP's)/downhole tools/packers/submersible pumps/seals etc. Having to deal with spent acid during the back flush process is also very expensive as these acids typically are still at a low pH and remain toxic. It is advantageous to have an acid blend that can be exported to production facilities through pipelines that once spent or applied, is commonly close to a neutral pH greatly reducing disposal costs/fees.

Acids perform many actions in the oil & gas industry and are considered necessary to achieve the desired production of various petroleum wells, maintain their respective systems and aid in certain functions (i.e. freeing stuck pipe). The associated dangers that come with using acids are expansive and tasking to mitigate through controls whether they are chemically or mechanically engineered Eliminating or even simply reducing the negative effects of acids while maintaining their usefulness is a struggle for the industry. As the public demand for the use of cleaner/safer/greener products increases, companies are looking for alternatives that perform the required function without all or most of the drawbacks associated with the use of conventional acids.

U.S. Pat. No. 4,402,852 discloses compositions containing 5 to 75% of urea, 5 to 85% of sulfuric acid and from 5 to 75% of water. These compositions are said to have reduced corrosiveness to carbon steels.

U.S. Pat. No. 6,147,042 discloses compositions comprising a polyphosphoric acid-urea condensate or polymer which results from the reaction of orthophosphoric acid and urea used in the removal of etching residue containing organometal residues.

U.S. Pat. No. 7,938,912 discloses compositions containing hydrochloric acid, urea, a complex substituted keto-amine-hydrochloride, an alcohol, an ethoxylate and a ketone for use to clean surfaces having cementitious compositions.

U.S. Pat. Nos. 8,430,971 and 8,580,047 disclose and claim compositions containing specific amounts of hydrochloric acid (55% by wt); urea (42% by wt), a complex substituted keto-amine-hydrochloride (0.067% by wt); propargyl alcohol (0.067% by wt); an ethoxylated nonylphenyl (0.022% by wt); methyl vinyl ketone (0.022% by wt); acetone (0.0022% by wt); and acetophenone (0.0022% by wt) for use in specific oil industry applications, namely oil drilling and hydraulic fracturing.

U.S. Pat. No. 5,672,279 discloses a composition containing urea hydrochloride prepared by mixing urea and hydrochloric acid. Urea hydrochloride is used to remove scale in hot water boilers and other industrial equipment such as papermaking equipment. Scale is caused by the presence of calcium carbonate which is poorly soluble in water and tends to accumulate on surfaces and affect equipment exposed to it.

U.S. Pat. No. 4,466,893 teaches gelled acid compositions comprising a gelling agent selected from the group consisting of galactomannans such as guar gum, gum karaya, gum tragacanth, gum ghatti, gum acacia, gum konjak, shariz, locus, psyllium, tamarind, gum tara, carrageenan, gum kauri, modified guars such as hydroxypropyl guar, hydroxyethyl guar, carboxymethyl hydroxyethyl guar, carboxymethyl hydroxypropyl guar and alkoxylated amines. This patent teaches that presence of urea has a marked impact on the viscosity of the gelled acid and the gelled acid compositions are used in fracking activities.

Several operations in the oil industry expose fluids to very high temperatures (some upward of 200° C.), the compositions used in these various operations need to withstand these high temperatures without losing their overall effectiveness. These compositions must be capable of being used in operations over a wide range of temperatures while not affecting the equipment with which it comes in contact.

Synthetic acid compositions are mostly applicable in the cleaning industry. However, such compositions require the additional of a number of various chemical compounds which are dangerous in their undiluted states. The physical process to make such cleaning compositions involves multiple steps of mixing, blending and dilution. The present invention proposes the removal of certain chemicals used which would rationalize the process to make the compositions of the present invention and therefore render the manufacturing process safer from a production point of view. Moreover, it was discovered that the composition according to the present invention exhibits stability for operations at elevated temperatures (above 65° C.) and therefore makes them useful in the oil and gas industry. The composition according to the present invention can ideally be used in various oilfield operations, such as: spearhead breakdown acid, acid fracturing operations, Injection-disposal well treatments, scale removal treatments (surface and subsurface-, equipment, pipelines, facilities), formation filter cake removal, tubing pickling, matrix acid squeezes and soaks, cement squeeze breakdowns, fluid pH control, stuck pipe operations, and coiled tubing acid washes, soaks, squeezes.

The present invention provides a simpler/safer manufacturing process and abridged synthetic acid compositions for use in high temperature/volume applications such as various operations in the oilfield.

Consequently, there is still a need for compositions for use in the oil industry which can be used over this range of applications which can decrease a number of the associated dangers/issues typically associated with conventional acid applications to the extent that these acid compositions are considered much safer for handling on worksites.

SUMMARY OF THE INVENTION

Compositions according to the present invention have been developed for the oil & gas industry and its associated applications, by targeting the problems of metal corrosion, logistics/handling, human/environmental exposure and formation/fluid compatibilities.

It is an object of the present invention to provide a synthetic acid composition which can be used over a broad range of applications in the oil and gas industry and which exhibit advantageous properties over known compositions.

According to one aspect of the present invention, there is provided a synthetic acid composition which, upon proper use, results in a very low corrosion rate of oil and gas industry tubulars/equipment.

According to another aspect of the present invention, there is provided a synthetic acid composition for use in the oil industry which is biodegradable.

According to another aspect of the present invention, there is provided a synthetic acid composition for use in the oil industry which has a controlled spending (reacting) nature that is near linear as temperature increases, non-fuming, non-toxic, and has a highly controlled manufacturing process ensuring consistent end product strength.

According to another aspect of the present invention, there is provided a synthetic acid composition for use in the oil industry which has a pH below 1.

According to another aspect of the present invention, there is provided a synthetic acid composition for use in the oil industry which has minimal exothermic reactivity upon dilution or reaction. Typically adding a strong acid to a fluid (water, base etc.) will cause an aggressive rise in fluid temperature. Certain preferred embodiments of the present invention do not exhibit this effect to the same degree such that the exothermic reaction is minimal when combined with typical industrial fluids, such saline water, fresh water or even a high pH fluid.

According to another aspect of the present invention, there is provided a synthetic acid composition for use in the oil industry which is compatible with existing industry additives.

According to another aspect of the present invention, there is provided a synthetic acid composition for use in the oil industry which has high salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water greatly reducing the logistics requirement. A conventional acid system may precipitate salts/minerals heavily if blended with fluids of an excessive saline level resulting in formation plugging or ancillary damage inhibiting production and substantially increasing costs. Brines are also typically present in formations, thus having an acid system that has a high tolerance for brines greatly reduces the potential for formation damage or emulsions forming down-hole during or after product placement/spending occurs.

According to another aspect of the present invention, there is provided a synthetic acid composition for use in the oil industry which is immediately reactive upon contact/application. Many acids that are considered safe have a slower reaction rate, a reduced capacity to solubilize, or a delayed reaction rate, making them ineffective or uneconomical in some applications. Strong mineral acids have very high hazards associated to them, but are immediately reactive. Preferred embodiments of the present invention are immediately active, even at lower concentrations. This immediate activity allows for a standard operating procedure to be followed, minimizing operational changes. Many operations that utilize a mineral acid, such as HCl, will not need to alter their standard operating procedure to utilize preferred compositions of the present invention.

According to another aspect of the present invention, there is provided a synthetic acid composition for use in the oil industry which results in less unintended near wellbore erosion due to the controlled reaction rate. This, in turn, results in deeper formation penetration, increased permeability, and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of neat-wellbore compressive strength resulting in communication between zones or sections of interest as well as potential sand production, and fines migration. It is advantageous to have an alternative that will react with a much more controlled rate or speed, thus greatly reducing the potential for zonal communication and the above potential negative side effects of traditional acid systems.

According to another aspect of the present invention, there is provided a synthetic acid composition for use in the oil industry said composition having a low evaporation rate. Acids normally utilized in industrial operations typically have a high tendency to evaporate or fume, especially at higher concentrations. Preferred embodiments of the present invention do not exhibit this tendency and have very low fuming effect, even in at high concentration. Hydrochloric acid will produce hazardous fumes, such as chlorine gas, which can be fatal in higher concentration. Preferred embodiments of the present invention do not produce hazardous fumes, in any concentration.

According to another aspect of the present invention, there is provided a synthetic acid composition for use in the oil industry which provides a controlled and comprehensive reaction throughout a broad range of temperatures. Preferred embodiments of the present invention have reaction rates that can be controlled or greatly "slowed or increased" for specific applications where a reduced (or increased) reaction rate is an advantage simply by adjusting the amount of water blended with the product. Preferred compositions of the present invention can be diluted substantially <10%, yet still remain effective in many applications, such as scale control, as well as further increasing the HSE benefits. As preferred compositions of the present invention are diluted the reaction rate, or solubilizing ability, of the product will remain linear.

Accordingly, the product would overcome many of the drawbacks found in the use of compositions of the prior art related to the oil & gas industry.

According to an aspect of the present invention, there is provided a use of a synthetic acid composition in the oil industry to stimulate formations.

According to an aspect of the present invention, there is provided a use of a synthetic acid composition in the oil industry to assist in reducing breakdown pressures during downhole pumping operations.

According to an aspect of the present invention, there is provided a use of a synthetic acid composition in the oil industry to treat wellbore filter cake post drilling operations.

According to an aspect of the present invention, there is provided a use of a synthetic acid composition in the oil industry to assist in freeing stuck pipe.

According to an aspect of the present invention, there is provided a use of a synthetic acid composition in the oil industry to descale pipelines and/or production wells.

According to an aspect of the present invention, there is provided a use of a synthetic acid composition in the oil industry to increase the infectivity rate of injection wells.

According to an aspect of the present invention, there is provided a use of a synthetic acid composition in the oil industry to lower the pH of fluids.

According to an aspect of the present invention, there is provided a use of a synthetic acid composition in the oil industry to remove undesirable scale in surface equipment, wells and related equipment and/or facilities.

According to an aspect of the present invention, there is provided a use of a synthetic acid composition in the oil industry to fracture wells.

According to an aspect of the present invention, there is provided a use of a synthetic acid composition in the oil industry to perform matrix stimulations.

According to an aspect of the present invention, there is provided a use of a synthetic acid composition in the oil industry to conduct annular and bullhead squeezes & soaks.

According to an aspect of the present invention, there is provided a use of a synthetic acid composition in the oil industry to pickle tubing, pipe and/or coiled tubing.

According to an aspect of the present invention, there is provided a use of a synthetic acid composition in the oil industry to increase effective permeability of formations.

According to an aspect of the present invention, there is provided a use of a synthetic acid composition in the oil industry to reduce or remove wellbore damage.

According to an aspect of the present invention, there is provided a use of a synthetic acid composition in the oil industry to clean perforations.

According to an aspect of the present invention, there is provided a use of a synthetic acid composition in the oil industry to solubilize limestone, dolomite, calcite and combinations thereof.

According to an aspect of the invention, there is provided a synthetic acid composition comprising:

urea & hydrogen chloride in a molar ratio of not less than 0.1:1; preferably in a molar ratio not less than 0.5:1, more preferably in a molar ratio not less than 1.0:1;

a metal iodide or iodates, preferably cupric iodide, potassium iodide, lithium iodide or sodium iodide; in an amount ranging from 0.01-0.5%, preferably in an amount of approximately 0.022%; potassium iodide is the preferred compound;

an alcohol or derivative thereof, preferably alkynyl alcohol, more preferably a derivative of propargyl alcohol; in an amount ranging from 0.1-2.0%, preferably in an amount of approximately 0.25%; 2-Propyn-1-ol, complexed with methyloxirane is the preferred component;

optionally, formic acid or a derivative thereof selected from the group consisting of: acetic acid, ethylformate and butyl formate are present in an amount ranging from 0.05-2.0%, preferably in an amount of approximately 0.1%; formic acid is the preferred compound;

optionally, cinnamaldehyde or a derivative amine thereof; present in an amount ranging from 0.01-1.0%, preferably in an amount of approximately 0.03%; cinnamaldehyde is the preferred compound;

optionally a propylene glycol or a derivative thereof present in an amount ranging from 0.05-1.0%, preferably in an amount of approximately 0.05%; propylene glycol is the preferred compound; and optionally, a phosphonic acid or derivatives, preferably alkylphosphonic acid or derivatives thereof and more preferably amino tris methylene phosphonic acid and derivatives thereof.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

Urea-HCl is the main component in terms of volume and weight percent of the composition of the present invention, and consists basically of a carbonyl group connecting with nitrogen and hydrogen. When added to hydrochloric acid, there is a reaction that results in urea hydrochloride, which basically traps the chloride ion within the molecular structure. This reaction greatly reduces the hazardous effects of the hydrochloric acid on its own, such as the fuming effects, the hygroscopic effects, and the highly corrosive nature (the $Cl^-$ ion will not readily bond with the Fe ion). The excess nitrogen can also act as a corrosion inhibitor at higher temperatures. Urea & Hydrogen chloride in a molar ratio of not less than 0.1:1; preferably in a molar ratio not less than 0.5:1, and more preferably in a molar ratio not less than 1.0:1. However, this ratio can be increased depending on the application.

It is preferable to add the urea at a molar ratio greater than 1 to the moles of HCl acid (or any acid). This is done in order to bind any available $Cl^-$ ions, thereby creating a safer, more inhibited product. Preferably, the composition according to the present invention comprises 1.05 moles of urea per 1.0 moles of HCl. The urea (hydrochloride) also allows for a reduced rate of reaction when in the presence of carbonate-based materials. This again due to the stronger molecular bonds associated over what hydrochloric acid traditionally displays. Further, since the composition according to the present invention is mainly comprised of urea (which is naturally biodegradable), the product testing has shown that the urea hydrochloride will maintain the same biodegradability function, something that hydrochloric acid will not on its own.

The use of formic acid as a corrosion inhibitor has been known for decades. However, the high concentrations in which its use has been reported along with the compounds it has been intermixed with have not made it a desirable compound in many applications. Prior art compositions containing formic acid require the presence of quinoline containing compounds or derivatives thereof, which render their use, in an increasingly environmentally conscious world, quite restricted.

In the present invention, formic acid or a derivative thereof such as formic acid, acetic acid, ethylformate and butyl formate can be added in an amount ranging from 0.05-2.0%, preferably in an amount of approximately 0.1%. Formic acid is the preferred compound, and is included on the PLONOR (Pose Little Or NO Risk to the environment) list for offshore oilfield use.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works extremely well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle. This is also a product that is approved for use offshore in the North Sea oilfield areas.

Metal iodides or iodates such as potassium iodide, sodium iodide, cuprous iodide and lithium iodide can potentially be used as corrosion inhibitor intensifier. In fact, potassium iodide is a metal iodide traditionally used as corrosion inhibitor intensifier, however it is expensive, but works extremely well. It is non-regulated and friendly to handle, and is included on the PLONOR (Pose Little Or NO Risk to the environment) list for offshore oilfield use.

Phosphonic acids and derivatives such as amino tris methylene phosphonic acid (ATMP) have some value as scale inhibitors. In fact, ATMP is a chemical traditionally used as an oilfield scale inhibitor, it has been found, when used in combination with urea/HCl, to increase the corrosion inhibition or protection. It has a good environmental profile, is readily available and reasonably priced.

Amino tris (methylenephosphonic acid) (ATMP) and its sodium salts are typically used in water treatment operations as scale inhibitors. They also find use as detergents and in cleaning applications, in paper, textile and photographic industries and in off-shore oil applications. Pure ATMP presents itself as a solid but it is generally obtained through process steps leading to a solution ranging from being colourless to having a pale yellow colour. ATMP acid and some of its sodium salts may cause corrosion to metals and may cause serious eye irritation to a varying degree dependent upon the pH/degree of neutralization.

ATMP must be handled with care when in its pure form or not in combination with certain other products. Typically, ATMP present in products intended for industrial use must be maintained in appropriate conditions in order to limit the exposure at a safe level to ensure human health and environment.

Amino tris (methylenephosphonic acid) and its sodium salts belong to the ATMP category in that all category members are various ionized forms of the acid. This category includes potassium and ammonium salts of that acid. The properties of the members of a category are usually consistent. Moreover, certain properties for a salt, in ecotoxicity studies, for example, can be directly appreciated by analogy to the properties of the parent acid. Amino tris (methylenephosphonic acid) may specifically be used as an intermediate for producing the phosphonates salts. The salt is used in situ (usually the case) or stored separately for further neutralization. One of the common uses of phosphonates is as scale inhibitors in the treatment of cooling and boiler water systems. In particular, for ATMP and its sodium salts are used in to prevent the formation of calcium carbonate scale.

In preferred embodiments of the present invention, 2-Propyn-1-ol, complexed with methyloxirane can be present in a range of 0.1-2.0%, preferably it is present in an amount of approximately 0.25%. Potassium Iodide can be present in a range of 0.01-0.5%, preferably it is present in an amount of approximately 0.022%. Formic Acid can be present in a range of 0.05-2.0%, preferably it is present in an amount of approximately 0.1%.

As a substitute for traditional propargyl alcohol, a preferred embodiment of the present invention uses 2-Propyn-1-ol, complexed with methyloxirane. As a substitute for potassium iodide one could use sodium iodide, copper iodide and lithium iodide. However, potassium iodide is the most preferred. As a substitute for formic acid one could use acetic acid. However, formic acid is most preferred. As a substitute for propylene glycol one could use ethylene glycol, glycerol or a mixture thereof. Propylene glycol being the most preferred. As a substitute for cinnamaldehyde one could use cinnamaldehyde derivatives and aromatic aldehydes selected from the group consisting of dicinnamaldehyde p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde n-trimethylammoniumcinnamaldehyde sulfate; p-trimethylammoniumcinnamaldehyde o-methylsulfate; p-thiocyanocinnamaldehyde; p-(S-acetyl)thiocinnamaldehyde; p-(S—N,N-dimethylcarbannoylthio)cinnamaldehyde; p-chorocinnamaldehyde; α-methylcinnamaldehyde; β-methylcinnamaldehyde; α-chlorocinnamaldehyde α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde and p-methyl-α-pentylcinnamaldehyde. The most preferred is cinnamaldehyde.

Example 1—Process to Prepare a Composition According to a Preferred Embodiment of the Invention Start with a 50% by weight solution of pure urea liquor. Add a 36% by weight solution of hydrogen chloride while circulating until all reactions have completely ceased. The ATMP is then added followed by propargyl alcohol (or derivative), and potassium iodide. Circulation is maintained until, all products have been solubilized. Additional products are added now as required (iron control, demulsifier, etc.).

Table 1 lists the components of the composition of Example 1, including their weight percentage as compared to the total weight of the composition and the CAS numbers of each component.

TABLE 1

Composition of a certain embodiment of the present invention

| Chemical | % Wt Composition | CAS# |
|---|---|---|
| Water | 60.315 | 7732-18-5 |
| Urea Hydrochloride | 39.0% | 506-89-8 |
| Amino tris methylene phosphonic acid | 0.576% | 6419-19-8 |
| Propargyl Alcohol | 0.087% | 107-19-7 |
| Potassium Iodide | 0.022% | 7681-11-0 |

The resulting composition of Example 1 is a clear, odourless liquid having shelf-life of greater than 1 year. It has a freezing point temperature of approximately minus 30° C. and a boiling point temperature of approximately 1.00° C. It has a specific gravity of 1.15±0.02. It is completely soluble in water and its pH is less than 1.

The composition is biodegradable and is classified as a non-irritant according to the classifications for skin tests. The composition is non-fuming and has no volatile organic compounds nor does it have any BTEX levels above the drinking water quality levels. BTEX refers to the chemicals benzene, toluene, ethylbenzene and xylene. Toxicity testing was calculated using surrogate information and the $LD_{50}$ was determined to be greater than 2000 mg/kg.

With respect to the corrosion impact of the composition on typical oilfield grade steel, it was established that it was clearly well below the acceptable corrosion limits set by industry for certain applications, such as spearhead applications or lower temperature scaling.

Example 2

Table 2 lists the components of the composition of Example 2 including their weight percentage as compared to the total weight of the composition and the CAS numbers of each component

TABLE 2

Composition according to an embodiment of the present invention

| Chemical | % Wt Composition | CAS# |
|---|---|---|
| Water | 58.92% | 7732-18-5 |
| Urea Hydrochloride | 40.6% | 506-89-8 |
| 2-Propyn-1-ol, complexed with methyloxirane | 0.2% | 38172-91-7 |
| Potassium Iodide | 0.05% | 7681-11-0 |
| Formic Acid | 0.15% | 64-18-6 |
| Propylene Glycol | 0.05% | 57-55-6 |
| Cinnamaldehyde | 0.03% | 14371-10-9 |

Corrosion Testing

The composition of Example 2 according to the present invention was exposed to corrosion testing. The results of the corrosion tests are reported in Table 3.

Samples of J55 grade steel were exposed to various synthetic acid solutions for periods of time ranging up to 24 hours at 90° C. temperatures. All of the tested compositions contained HCl and urea in a 1:1.05 ratio,

TABLE 3

Corrosion testing comparison between HCl-Urea and the composition of Example 2 at a 100% concentration

| Inhibitor (%) | Initial wt. (g) | Final wt. (g) | Loss wt. (g) | Surface area (cm2) | Density (g/cc) | Run time (hours) | Mils/yr | mm/year | lb/ft² |
|---|---|---|---|---|---|---|---|---|---|
| HCl-Urea | 37.616 | 34.324 | 3.092 | 28.922 | 7.86 | 6 | 7818.20 | 198.582 | 0.222 |
| HCl-Urea | 37.616 | 31.066 | 6.550 | 28.922 | 7.86 | 24 | 4140.46 | 105.168 | 0.470 |
| Example #2 | 37.524 | 37.313 | 0.211 | 28.922 | 7.86 | 6 | 533.519 | 13.551 | 0.015 |
| Example #2 | 37.524 | 35.540 | 1.984 | 28.922 | 7.86 | 24 | 1254.149 | 31.855 | 0.142 |

This type of corrosion testing helps to determine the impact of the use of such synthetic replacement acid composition according to the present invention compared to the industry standard HCl blends or any other mineral or organic acid blends). The results obtained for the composition containing only HCl and urea were used as a baseline to compare the other compositions.

Additionally, the compositions according to the present invention will allow the end user to utilize an alternative to conventional acids that has transportation and storage advantages as well as health, safety and environmental advantages. Enhancement in short/long term corrosion control is one of the key advantages of the present invention. The reduction in skin corrosiveness, the elimination of corrosive fumes, the controlled spending nature, and the high salt tolerance are some other advantages of compositions according to the present invention.

Aquatic Toxicity Testing

The biological test method that was employed was the Reference Method for Determining acute lethality using rainbow trout (1990—Environment Canada, EPS 1/RM/9— with the May 1996 and May 2007 amendments).

The Trout 96 hour Acute Test (WTR-ME-041) was performed at 5 different concentrations of compositions (62.5, 125, 250, 500 and 1000 ppm) one replicate per treatment, ten fish per replicate.

The test results indicate that at concentrations of the composition of Example 2 of up to and including 500 ppm there was a 100% survival rate in the fish sample studied. This is an indicator that the composition of Example 2 demonstrates an acceptable environmental safety profile.

Dermal Testing

The objective of this study was to evaluate the dermal irritancy and corrosiveness of the composition of Example 2, following a single application to the skin of New Zealand White rabbits. The undiluted test substance was placed on the shaved back of each of the three rabbits used in the study. The treated site was then covered by a gauze patch and secured with porous tape. The entire midsection of each rabbit was wrapped in lint-free cloth secured by an elastic adhesive bandage. The untreated skin site of each rabbit served as a control for comparison purposes. All wrapping materials were removed from each rabbit 4 hours following application of the test substance. The application site was then rinsed with water and wiped with gauze to remove any residual test substance. The skin of each rabbit was examined at 30-GO minutes and 24, 48 and 72 hours following removal of the wrappings. Descriptions of skin reactions were recorded for each animal. Dermal irritation scores were calculated for each time point, and a Primary Dermal Irritation Score was calculated according to the Draize descriptive ratings for skin irritancy.

Tables 4 and 5 report the results of the dermal testing. The scores for edema and erythema/eschar formation were "0" at all scoring intervals for all three rabbits. According to the Draize descriptive ratings for skin irritancy, the Primary Dermal Irritation Score (based on the 24- and 72-hour scoring intervals) for the test substance under the conditions employed in this study was 0.00. Thus, the composition of Example 2 was determined to be a non-irritant to the skin of New Zealand White rabbits. However, this conclusion was drawn without characterization of the test substance.

TABLE 4

Description of Individual Skin Reactions upon exposure to composition of Example 2

| Animal Number (sex) | | Scoring Interval (Time Following Removal of Wrappings) | | | |
|---|---|---|---|---|---|
| | | 30-60 Minutes | 24 Hours | 48 Hours | 72 Hours |
| | | Skin Reactions Scores | | | |
| 819 (F) | Edema[b] | 0 | 0 | 0 | 0 |
| | Erythema/eschar[c] | 0 | 0 | 0 | 0 |
| 820 (F) | Edema | 0 | 0 | 0 | 0 |
| | Erythema/eschar | 0 | 0 | 0 | 0 |

TABLE 4-continued

Description of Individual Skin Reactions upon exposure to composition of Example 2

| Animal Number (sex) | | Scoring Interval (Time Following Removal of Wrappings) | | | |
|---|---|---|---|---|---|
| | | 30-60 Minutes | 24 Hours | 48 Hours | 72 Hours |
| | | Skin Reactions Scores | | | |
| 821 (F) | Edema | 0 | 0 | 0 | 0 |
| | Erythema/eschar | 0 | 0 | 0 | 0 |

[a]see protocol Table 1 (Appendix A) for a detailed description of the Draize scoring scale (Draize, J. H., Appraisal of the Safety of Chemicals in Foods, Drugs, and Cosmetics, Assoc. Food & Drug Officials of the U.S., Austin, TX, 1959)
[b]edema: 0 = none, 1 = very slight, 2 = slight, 3 = moderate, 4 (maximum possible) = severe
[c]erythema/eschar: 0 = none, 1 = very slight, 2 = well-defined, 3 = moderate to severe, 4 (maximum possible) = severe erythema to slight eschar formation

TABLE 5

Primary Dermal Irritation Score of Individual Skin Reactions upon exposure to composition of Example 2

| | Scoring Interval (Time Following Removal of Wrappings) | | | |
|---|---|---|---|---|
| Edema Score | 30-60 Minutes | 30-60 Minutes | 30-60 Minutes | 30-60 Minutes |
| | Skin Reactions Scores Summary[b] | | | |
| 0 | 3/3 | 3/3 | 3/3 | 3/3 |
| 1 | 0/3 | 0/3 | 0/3 | 0/3 |
| 2 | 0/3 | 0/3 | 0/3 | 0/3 |
| 3 | 0/3 | 0/3 | 0/3 | 0/3 |
| 4 | 0/3 | 0/3 | 0/3 | 0/3 |
| Positive Score Mean | 0.00 | 0.00 | 0.00 | 0.00 |
| Erythema and/or Eschar Formation Score | Skin Reactions Scores Summary[b] | | | |
| 0 | 3/3 | 3/3 | 3/3 | 3/3 |
| 1 | 0/3 | 0/3 | 0/3 | 0/3 |
| 2 | 0/3 | 0/3 | 0/3 | 0/3 |
| 3 | 0/3 | 0/3 | 0/3 | 0/3 |
| 4 | 0/3 | 0/3 | 0/3 | 0/3 |
| Positive Score Mean | 0.00 | 0.00 | 0.00 | 0.00 |
| Irritation Score Subtotal[c] | 0.00 | 0.00 | 0.00 | 0.00 |
| PRIMARY DERMAL IRRITATION SCORE (DRAIZE): | 0.00 (24-hour subtotal) + 0.00 (72-hour subtotal) = 0.00 (total score) 0.00 (total score)/2 = 0.00 (Primary Dermal Irritation Score) | | | |

[a]see protocol Table 1 (Appendix A) for a detailed description of the Draize scoring scale (Draize, J. H., Appraisal of the Safety of Chemicals in Foods, Drugs, and Cosmetics, Assoc. Food & Drug Officials of the U.S., Austin, TX, 1959)
[b]Number or animals with score/number of animals dosed
[c]Irritation score subtotal = mean erythema score + mean edema score Corrosion Testing Corrosion testing using the composition of Example 2 was carried out under various conditions of temperature and on different steels to show the breadth of the applications for which compositions according to the present invention can be used. Table 6 sets out the test results of corrosion test that were carried out on N-80 steel (density of 7.86 g/ee) using the composition of Example 2 at a 50% concentration. Table 7 reports the test results of corrosion tests that were carried out on J-55 steel (density of 7.86 g/cc) using the composition of Example 2 at a 50% concentration. Table 8 reports the test results of corrosion tests that were carried out on various metal samples using the composition of Example 2 at a 100% concentration. These test results show that the composition of Example 2 meets the regulatory standards for the transportation industry on mild steel, and provides a strong level of protection with respect to aluminum.

TABLE 6

Corrosion tests carried out on N-80 steel (density of 7.86 g/cc) using the composition of Example 2 at a 50% concentration

| Temp ° C. | Initial Wt. (g) | Final wt. (g) | Loss wt. (g) | Surface Area (cm2) | Run Time (hours) | Mils/yr | mm/year | lb/ft2 |
|---|---|---|---|---|---|---|---|---|
| 70° C. | 40.898 | 40.863 | 0.035 | 27.11 | 6 | 94.41353 | 2.398 | 0.003 |
| 70° C. | 40.898 | 40.816 | 0.082 | 27.11 | 24 | 55.29936 | 1.405 | 0.006 |
| 90° C. | 40.896 | 40.838 | 0.058 | 27.11 | 6 | 156.4567 | 3.974 | 0.004 |
| 90° C. | 40.896 | 40.740 | 0.156 | 27.11 | 24 | 105.2037 | 2.672 | 0.011 |

TABLE 7

Corrosion tests carried out on J-55 steel (density of 7.86 g/cc) using the composition of Example 2 at a 50% concentration

| Temp ° C. | Initial Wt. (g) | Final wt. (g) | Loss wt. (g) | Surface Area (cm2) | Run Time (hours) | Mils/yr | mm/year | lb/ft2 |
|---|---|---|---|---|---|---|---|---|
| 30° C. | 37.705 | 37.700 | 0.005 | 28.922 | 6 | 12.64263 | 0.321 | 0.000 |
| 30° C. | 37.705 | 37.692 | 0.013 | 28.922 | 24 | 8.217709 | 0.209 | 0.001 |
| 30° C. | 37.705 | 37.676 | 0.029 | 28.922 | 72 | 6.110604 | 0.155 | 0.002 |
| 50° C. | 37.513 | 37.502 | 0.011 | 28.922 | 6 | 27.81378 | 0.706 | 0.001 |
| 50° C. | 37.513 | 37.485 | 0.028 | 28.922 | 24 | 17.69968 | 0.450 | 0.002 |
| 70° C. | 37.435 | 37.396 | 0.039 | 28.922 | 6 | 98.61251 | 2.505 | 0.003 |
| 70° C. | 37.435 | 37.350 | 0.085 | 28.922 | 24 | 53.73117 | 1.365 | 0.006 |
| 90° C. | 37.514 | 37.430 | 0.084 | 28.922 | 6 | 212.3962 | 5.395 | 0.006 |
| 90° C. | 37.514 | 37.255 | 0.259 | 28.922 | 24 | 163.7221 | 4.159 | 0.018 |

Example 3

Table 9 lists the components of the composition of Example 3 including their weight percentage as compared to the total weight of the composition and the CAS numbers of each component.

TABLE 9

Composition of a preferred embodiment of the present invention

| Chemical | % Wt Composition | CAS# |
|---|---|---|
| Water | 59.028% | 7732-18-5 |
| Urea Hydrochloride | 40.6% | 506-89-8 |
| 2-Propyn-1-ol, complexed with methyloxirane | 0.25% | 38172-91-7 |
| Potassium Iodide | 0.022% | 7681-11-0 |
| Formic Acid | 0.1% | 64-18-6 |

Corrosion Testing

TABLE 8

Corrosion tests carried out on various metal samples using the composition of Example 2 at a 100% concentration

| Coupon | Temp ° C. | Initial Wt. (g) | Final wt. (g) | Loss wt. (g) | Surface Area (cm2) | Density g/cc | Run Time (hours) | Mils/yr | mm/year | lb/ft2 |
|---|---|---|---|---|---|---|---|---|---|---|
| 1018 steel | 55° C. | 13.994 | 13.955 | 0.039 | 28.503 | 7.82 | 72 | 8.381163 | 0.213 | 0.003 |
| 7075 aluminum | 25° C. | 6.196 | 6.185 | 0.011 | 29.471 | 2.81 | 6 | 76.35013 | 1.939 | 0.001 |
| 7075 aluminum | 25° C. | 6.196 | 6.080 | 0.116 | 29.471 | 2.81 | 24 | 201.2867 | 5.113 | 0.008 |
| 7075 aluminum | 25° C. | 6.196 | 1.344 | 4.852 | 29.471 | 2.81 | 48 | 4209.668 | 106.926 | 0.344 |

The compositions of Example 2 and 3 according to the present invention were exposed to corrosion testing. The results of the corrosion tests are reported in Table 10.

Samples of J55 grade steel were exposed to various synthetic acid solutions for periods of time ranging up to 24 hours at 90° C. temperatures. All of the tested compositions contained HCl and urea in a 1:1.05 ratio.

TABLE 10

Corrosion testing comparison between HCl-Urea and the compositions of Example 2 and 3 at a 100% concentration

| Inhibitor (%) | Initial wt. (g) | Final wt. (g) | Loss wt. (g) | Surface area (cm2) | Density (g/cc) | Run time (hours) | Mils/yr | mm/year | lb/ft$^2$ |
|---|---|---|---|---|---|---|---|---|---|
| HCl-Urea | 37.616 | 34.524 | 3.092 | 28.922 | 7.86 | 6 | 7818.20 | 198.582 | 0.222 |
| HCl-Urea | 37.616 | 31.066 | 6.550 | 28.922 | 7.86 | 24 | 4140.46 | 105.168 | 0.470 |
| Example #2 | 37.524 | 37.313 | 0.211 | 28.922 | 7.86 | 6 | 533.519 | 13.551 | 0.015 |
| Example #2 | 37.524 | 35.540 | 1.984 | 28.922 | 7.86 | 24 | 1254.149 | 31.855 | 0.142 |
| Example #3 | 37.714 | 37.520 | 0.194 | 28.922 | 7.86 | 6 | 490.534 | 12.460 | 0.014 |
| Example #3 | 37.714 | 37.329 | 0.385 | 28.922 | 7.86 | 24 | 243.371 | 6.182 | 0.027 |

This type of corrosion testing helps to determine the impact of the use of such synthetic replacement acid composition according to the present invention compared to the industry standard (MCI blends or any other mineral or organic acid blends). The results obtained for the composition containing only HCl and urea were used as a baseline to compare the other compositions. Additionally, the compositions according to the present invention will allow the end user to utilize an alternative to conventional acids that has the down-hole performance advantages, transportation and storage advantages as well as the health, safety and environmental advantages. Enhancement in short/long term corrosion control is one of the key advantages of the present invention. The reduction in skin corrosiveness, the elimination of corrosive fumes, the controlled spending nature, and the high salt tolerance are some other advantages of compositions according to the present invention.

Aquatic Toxicity Testing

The biological test method that was employed was the Reference Method for Determining acute lethality using rainbow trout (1990—Environment Canada, EPS 1/RM/9—with the May 1996 and May 2007 amendments).

The Trout 96 hour Acute Test (WTR-ME-041) was performed at 5 different concentrations of compositions (62.5, 125, 250, 500 and 1000 ppm) one replicate per treatment, ten fish per replicate.

The test results indicate that at concentrations of the composition of Example 3 of up to and including 500 ppm there was a 100% survival rate in the fish sample studied. This is an indicator that the composition of Example 3 demonstrates a highly acceptable environmental safety profile.

Additional testing was carried out to assess the inhibition of marine algal growth, acute toxicity and biodegradability establish the safety for the environment.

Elastomer Testing

When common sealing elements used in the oil and gas industry come in contact with acid compositions they tend to degrade or at least show sign of damage. A number of sealing elements common to the industry were exposed to a composition according to a preferred embodiment of the present invention to evaluate the impact of the latter on their integrity. More specifically, the hardening and drying and the loss of mechanical integrity of sealing elements can have substantial consequences to the operations of wells and result in undesirable shut downs to replace defective sealing elements. Testing was carried out to assess the impact of the exposure of composition of Example 3 to various elastomers. Long term (72 hour exposure) elastomer testing on the concentrated product of Example 3 at 70° C. and 28,000 kPa showed little to no degradation of various elastomers, including Nitrile 70, Viton 75, Atlas 80, and EPDM 70 style sealing elements.

Corrosion Testing

Corrosion testing using the composition of Example 3 was carried out under various conditions of temperature and on different steels to show the breadth of the applications for which compositions according to the present invention can be used. Table 11 sets out the test results of corrosion test that were carried out on N-80 steel (density of 7.86 g/cc) using the composition of Example 3 at a 50% concentration. Table 12 reports the test results of corrosion tests that were carried out on J-55 steel (density of 7.86 Wee) using the composition of Example 3 at a 50% concentration. Table 13 reports the test results of corrosion tests that were carried out on various metal samples using the composition of Example 3 at a 100% concentration. These test results show that the composition of Example 3 meets the regulatory standards for the transportation industry on mild steel, and provide a strong level of protection with respect to aluminum. Table 14 lists a number of applications for which compositions according to the present invention can be used as well as proposed dilution ranges.

TABLE 11

Corrosion tests carried out on N-80 steel (density of 7.86 g/cc)
using the composition of Example 3 at a 50% concentration

| Temp ° C. | Initial Wt. (g) | Final wt. (g) | Loss wt. (g) | Surface Area (cm2) | Density g/cc | Run Time (hours) | Mils/yr | mm/year | lb/ft2 |
|---|---|---|---|---|---|---|---|---|---|
| 70° C. | 40.757 | 40.708 | 0.049 | 27.11 | 7.86 | 6 | 132.1789 | 3.357 | 0.003 |
| 70° C. | 40.757 | 40.609 | 0.148 | 27.11 | 7.86 | 24 | 99.80859 | 2.535 | 0.010 |
| 90° C. | 40.712 | 40.617 | 0.095 | 27.11 | 7.86 | 6 | 256.2653 | 6.509 | 0.007 |
| 90° C. | 40.712 | 40.475 | 0.237 | 27.11 | 7.86 | 24 | 159.8286 | 4.060 | 0.017 |

TABLE 12

Corrosion tests carried out on J-55 steel (density of 7.86 g/cc)
using the composition of Example 3 at a 50% concentration

| Temp ° C. | Initial Wt. (g) | Final wt. (g) | Loss wt. (g) | Surface Area (cm2) | Density g/cc | Run Time (hours) | Mils/yr | mm/year | lb/ft2 |
|---|---|---|---|---|---|---|---|---|---|
| 50° C. | 38.366 | 38.342 | 0.024 | 28.922 | 7.86 | 6 | 60.68462 | 1.541 | 0.002 |
| 50° C. | 38.366 | 38.323 | 0.043 | 28.922 | 7.86 | 24 | 27.18165 | 0.690 | 0.003 |
| 70° C. | 38.728 | 38.596 | 0.132 | 28.922 | 7.86 | 6 | 333.7654 | 8.478 | 0.009 |
| 70° C. | 38.728 | 38.448 | 0.280 | 28.922 | 7.86 | 24 | 176.9968 | 4.496 | 0.020 |
| 90° C. | 37.543 | 37.463 | 0.080 | 28.922 | 7.86 | 6 | 202.2821 | 5.138 | 0.006 |
| 90° C. | 37.543 | 37.106 | 0.437 | 28.922 | 7.86 | 24 | 276.2415 | 7.017 | 0.031 |

TABLE 13

Corrosion tests carried out on various metal samples using
the composition of Example 3 at a 100% concentration

| Coupon | Temp ° C. | Initial Wt. (g) | Final wt. (g) | Loss wt. (g) | Surface Area (cm2) | Density g/cc | Run Time (hours) | Mils/yr | mm/year | lb/ft2 |
|---|---|---|---|---|---|---|---|---|---|---|
| 1018 steel | 55° C. | 13.994 | 13.955 | 0.039 | 28.503 | 7.82 | 72 | 8.381163 | 0.213 | 0.003 |
| 7075 aluminum | 25° C. | 6.196 | 6.080 | 0.116 | 29.471 | 2.81 | 24 | 201.2867 | 5.113 | 0.008 |
| 7075 aluminum | 25° C. | 6.196 | 1.344 | 4.852 | 29.471 | 2.81 | 48 | 4209.668 | 106.926 | 0.344 |

The uses (or applications) of the compositions according to the present invention upon dilution thereof ranging from approximately 1 to 75% dilution, include, but are not limited to: injection/disposal treatments; matrix acid squeezes, soaks or bullheads; acid fracturing, acid washes; fracturing spearheads (breakdowns); pipeline scale treatments, cement breakdowns or perforation cleaning; pH control; and descaling applications.

TABLE 14

Applications for which compositions according to the present invention can be used as
well as proposed dilution ranges

| Application: | Suggested Dilution: | Benefits: |
|---|---|---|
| Injection/Disposal Wells | 50% | Compatible with mutual solvents and solvent blends, very cost effective. |
| Squeezes & Soaks Bullhead Annular | 33%-50% | Ease of storage & handling, cost effective compared to conventional acid stimulations. Ability to leave pump equipment in wellbore. |
| Acid Fracs | 50%-75% | Decreased shipping and storage compared to conventional acid, no blend separation issues, comprehensive spend rate encourages deeper formation penetration. |
| Frac Spearheads (Break-downs) | 33%-66% | Able to adjust concentrations on the fly. Decreased shipping and storage on location. |
| Cement Break-downs | 50% | Higher concentrations recommended due to lower temperatures, and reduced solubility of aged cement. |
| pH Control | 0.1%-1.0% | Used in a variety of applications to adjust pH level of water based systems. |

TABLE 14-continued

Applications for which compositions according to the present invention can be used as well as proposed dilution ranges

| Application: | Suggested Dilution: | Benefits: |
|---|---|---|
| Liner De-Scaling, Heavy Oil | 1%-5% | Continuous injection/de-scaling of slotted liners, typically at very high temperatures. |

Use of a Composition According to the Present Spearhead on Multi-Well Pad

An operator in Western Canada was performing horizontal multi-stage fracturing completions on a multiple well pad, using plug and perforate technology. Traditional methods of formation breakdown required the use of 6-10 m³ of 15% HCl acid to be pumped down the casing prior to each fracturing stage.

Prior to testing, multiple samples of the high salinity fracturing water (recycled fracturing fluid) were tested for compatibility, as this was proposed to be used as the diluents for the concentrated synthetic acid. By storing the concentrated synthetic acid composition in a tank and diluting it with the fracturing water on site, only two storage tanks were required for the treatments (±360 m³ of spearhead acid). These are intended on being refilled periodically.

For each treatment, the tank of concentrated synthetic acid composition was blended on site through the fracturing blender with the fracturing water down to reach a concentration of ±33% of the initial composition. 6-10 in³ of the synthetic acid composition was pumped for each spearhead stage, all other operational components and procedures remained the same as traditional methods using HCl acid (15% HCl acid was on location for a comparison well).

A total of 18 stages per well were treated on more than 8 wells, with 100% breakdown success on every stage. Breakdown pressure differentials in the range of 10-15 MPa were observed, and were found to be very comparable to HCl acid.

The main advantages of the use of the synthetic acid composition included: the reduction of the total loads of acid, and the required number of tanks by delivering concentrated product to location and diluting with fluids available on location (high salinity production water). Other advantages of the composition according to the present invention include: operational efficiencies which led to the elimination of having to periodically circulate tanks of HCl acid due to chemical separation; reduced potential corrosion to downhole tuhulars; and reduced HCl acid exposure to personnel by having a non-hazardous, non-fuming acid on location.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims.

What is claimed is:

1. A synthetic acid composition for use in oil industry activities, said composition comprising:
   urea and hydrogen chloride in a molar ratio of not less than 0.1:1;
   a metal iodide or iodate;
   an alcohol or derivative thereof; and
   wherein the use in the oil industry is to stimulate formations.

2. The synthetic acid composition according to claim 1, further comprising formic acid or derivative thereof.

3. The synthetic acid composition according to claim 2, wherein the formic acid or a derivative thereof is selected from the group consisting of: formic acid, acetic acid, ethyl formate and butyl formate.

4. The synthetic acid composition according to claim 3, where the formic acid or derivative thereof is present in an amount ranging from 0.05-2.0% by weight of the composition.

5. The synthetic acid composition according to claim 2, where the formic acid or derivative thereof is formic acid.

6. The synthetic acid composition according to claim 1, further comprising propylene glycol or derivative thereof, ethylene glycol, glycerol or a mixture thereof.

7. The synthetic acid composition according to claim 6, where the compound selected from the group consisting of: propylene glycol or derivative thereof, ethylene glycol, glycerol or a mixture thereof, is present in a range of 0.05-1.0% by weight of the composition.

8. The synthetic acid composition according to claim 1, further comprising cinnamaldehyde or a derivative thereof.

9. The synthetic acid composition according to claim 8 where cinnamaldehyde or derivative thereof is present in the range of 0.01-1.0% by weight of the composition.

10. The synthetic acid composition according to claim 1, wherein the urea and hydrogen chloride are in a molar ratio of not less than 0.5:1.

11. The synthetic acid composition according to claim 10, wherein the urea and hydrogen chloride are in a molar ratio of not less than 1.0:1.

12. The synthetic acid composition according to claim 1, wherein the phosphonic acid derivative is aminoalkylphosphonic salt.

13. The synthetic acid composition according to claim 12, wherein the aminoalkylphosphonic salt is amino tris methylene phosphonic acid.

14. The synthetic acid composition according to claim 12, wherein the aminoalkylphosphonic salt is present in a concentration ranging from 0.25 to 1.0% w/w.

15. The synthetic acid composition according to claim 1, wherein the metal iodide or iodate is cuprous iodide.

16. The synthetic acid composition according to claim 1, wherein the metal iodide or iodate is potassium iodide.

17. The synthetic acid composition according to claim 1, wherein the metal iodide or iodate is sodium iodide.

18. The synthetic acid composition according to claim 1, wherein the metal iodide or iodate is lithium iodide.

19. The synthetic acid composition according to claim 1, wherein the alcohol or derivative thereof is an alkynyl alcohol or derivative thereof.

20. The synthetic acid composition according to claim 19, wherein the alkynyl alcohol or derivative thereof is propargyl alcohol or a derivative thereof.

21. The synthetic acid composition according to claim 19, wherein the alkynyl alcohol or derivative thereof is present in a concentration ranging from 0.1 to 2.0% w/w.

22. The synthetic acid composition according to claim 21, wherein the alkynyl alcohol or derivative thereof is present in a concentration of 0.25% w/w.

23. The synthetic acid composition according to claim 1, wherein the metal iodide is present in a concentration ranging from 100 to 500 ppm.

24. The use of a synthetic acid composition according to claim 1 in the oil industry to reduce or remove wellbore damage.

25. The synthetic acid composition according to claim 1, further comprising a phosphonic acid derivative.

26. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to treat wellbore filter cake post drilling operations.

27. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to descale pipelines and/or production wells.

28. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to increase an injectivity rate of injection wells.

29. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to lower the pH of fluids.

30. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to remove undesirable scale in surface equipment, wells and related equipment and/or facilities.

31. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to fracture wells.

32. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to perform matrix stimulations.

33. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to conduct annular and bullhead squeezes and soaks.

34. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to pickle tubing, pipe and/or coiled tubing.

35. A synthetic acid composition for use in oil industry activities, said composition comprising:
    urea and hydrogen chloride in a molar ratio of not less than 0.1:1;
    a metal iodide or iodate;
    an alcohol or derivative thereof; and
    wherein the use in the oil industry is to solubilize limestone, dolomite, calcite and combinations thereof.

* * * * *

EX PARTE REEXAMINATION CERTIFICATE (11878th)

United States Patent
Purdy et al.

(10) Number: US 10,035,944 C1
(45) Certificate Issued: *Jul. 12, 2021

(54) USING SYNTHETIC ACID COMPOSITIONS AS ALTERNATIVES TO CONVENTIONAL ACIDS IN THE OIL AND GAS INDUSTRY

(71) Applicant: FLUID ENERGY GROUP LTD, Calgary (CA)

(72) Inventors: Clay Purdy, Medicine Hat (CA); Darren Thatcher, High River (CA); Jon Garner, Stony Plain (CA); Bruce Ulmer, Stony Plain (CA)

(73) Assignee: FLUID ENERGY GROUP LTD, Calgary (CA)

Reexamination Request:
No. 90/014,383, Sep. 25, 2019

Reexamination Certificate for:
Patent No.: 10,035,944
Issued: Jul. 31, 2018
Appl. No.: 15/314,284
PCT Filed: May 28, 2015
PCT No.: PCT/CA2015/000346
§ 371 (c)(1),
(2) Date: Nov. 28, 2016
PCT Pub. No.: WO2015/179954
PCT Pub. Date: Dec. 3, 2015

( * ) Notice: This patent is subject to a terminal disclaimer.

(30) Foreign Application Priority Data

May 30, 2014 (CA) .................. CA 2852705
Oct. 2, 2014 (CA) .................. CA 2866688

(51) Int. Cl.
| | | |
|---|---|---|
| *C09K 8/528* | (2006.01) |
| *C09K 8/52* | (2006.01) |
| *C09K 8/54* | (2006.01) |
| *C09K 8/68* | (2006.01) |
| *C09K 8/72* | (2006.01) |
| *C09K 8/74* | (2006.01) |
| *C09K 8/86* | (2006.01) |
| *C23F 11/04* | (2006.01) |
| *E21B 31/00* | (2006.01) |
| *E21B 37/00* | (2006.01) |
| *E21B 37/06* | (2006.01) |
| *E21B 43/16* | (2006.01) |
| *E21B 43/26* | (2006.01) |

(52) U.S. Cl.
CPC ............... *C09K 8/528* (2013.01); *C09K 8/52* (2013.01); *C09K 8/54* (2013.01); *C09K 8/68* (2013.01); *C09K 8/72* (2013.01); *C09K 8/74* (2013.01); *C09K 8/86* (2013.01); *C23F 11/04* (2013.01); *E21B 31/00* (2013.01); *C09K 2208/02* (2013.01); *C09K 2208/20* (2013.01); *C09K 2208/22* (2013.01); *C09K 2208/32* (2013.01); *E21B 37/00* (2013.01); *E21B 37/06* (2013.01); *E21B 43/16* (2013.01); *E21B 43/26* (2013.01)

(58) Field of Classification Search
None
See application file for complete search history.

(56) References Cited

To view the complete listing of prior art documents cited during the proceeding for Reexamination Control Number 90/014,383, please refer to the USPTO's public Patent Application Information Retrieval (PAIR) system under the Display References tab.

*Primary Examiner* — Jerry D Johnson

(57) ABSTRACT

A synthetic acid composition for use in oil industry activities is disclosed. The composition comprises urea and hydrogen chloride in a molar ratio of not less than 0.1:1; a metal iodide or iodate; an alcohol or derivative thereof. Optionally, the composition may include formic acid or a derivative thereof propylene glycol or a derivative thereof, ethylene glycol glycerol or a mixture thereof; cinnamaldehyde or a derivative thereof; and a phosphonic acid derivative.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-35 are cancelled.

* * * * *